United States Patent [19]

Gallant

[11] Patent Number: 4,706,349

[45] Date of Patent: Nov. 17, 1987

[54] ADJUSTABLE CURVATURE ROLL

[75] Inventor: James O. Gallant, Dighton, Mass.

[73] Assignee: SW Industries, Inc., Providence, R.I.

[21] Appl. No.: 943,812

[22] Filed: Dec. 29, 1986

Related U.S. Application Data

[63] Continuation of Ser. No. 822,490, Jan. 21, 1986, abandoned.

[51] Int. Cl.$^4$ .............................................. D06C 3/06
[52] U.S. Cl. ................................................... 26/104
[58] Field of Search ................. 26/101, 102, 103, 104; 29/116 R, 116 AD; 301/127; 198/824

[56] References Cited

U.S. PATENT DOCUMENTS

| | | |
|---|---|---|
| 2,689,392 | 9/1954 | Robertson . |
| 2,898,662 | 8/1959 | Robertson . |
| 3,094,771 | 6/1963 | Robertson ..................... 29/116 AD |
| 3,099,072 | 7/1963 | Robertson et al. ............ 29/116 AD |
| 3,328,866 | 7/1967 | Robertson ..................... 29/116 AD |
| 3,389,450 | 6/1963 | Robertson . |
| 3,500,524 | 3/1970 | Jagminas . |
| 3,521,340 | 7/1970 | Gallant et al. ................ 29/116 AD |
| 3,665,572 | 5/1972 | Robertson . |
| 3,783,481 | 1/1974 | Gallant . |
| 3,838,480 | 10/1974 | Depuy . |
| 3,940,043 | 2/1976 | Staples .............................. 26/101 X |
| 4,012,821 | 3/1977 | Feaster . |

Primary Examiner—Robert R. Mackey
Attorney, Agent, or Firm—Pahl, Lorusso & Loud

[57] ABSTRACT

The adjustable-curvature roll of the present invention includes a hollow, cylindrical axle in which two rods are inserted. Each of these rods is securely fastened to an endplate at one end of the axle, and the opposite end of each rod is threaded within one of two oppositely rotating intermeshed gears. An adjusting hexagon or other similar adjusting device is connected to one of the meshed gears and the turning of the adjusting device in one direction causes an increase in the compression applied to one of the rods while at the same time exerting an increased tension on the other rod which is connected to the oppositely rotating gear. This combination of tension and compression causes the curvature of the roll to change. An indicator attached to the adjusting device provides a reading of the chosen degree of curvature. The axle may be surrounded by an outer sleeve which rotates, through the aid of ball bearings, around the axle.

25 Claims, 12 Drawing Figures

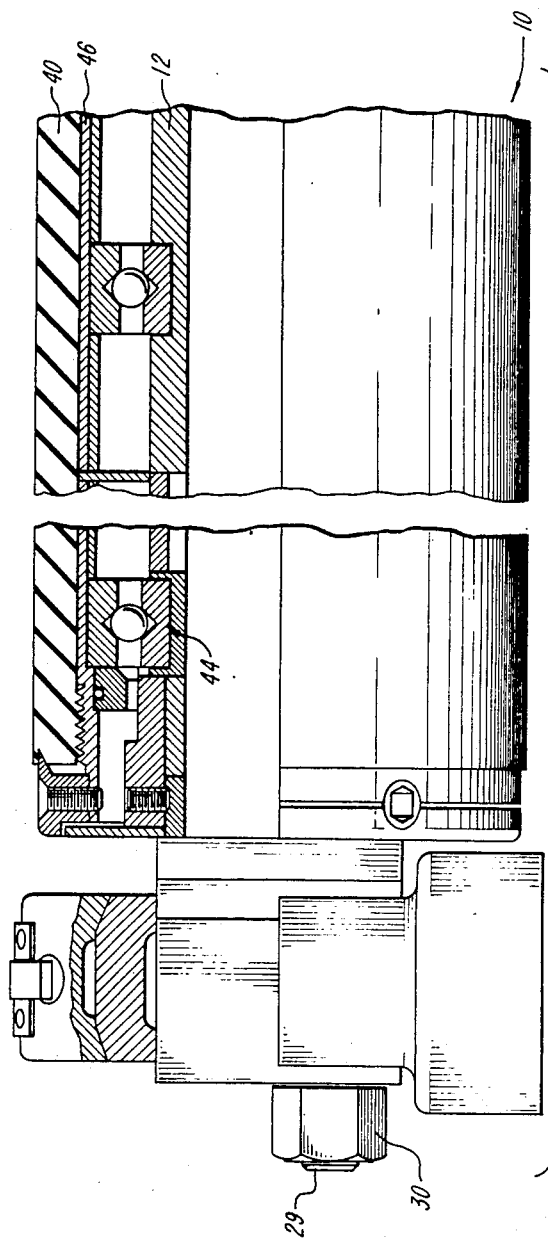

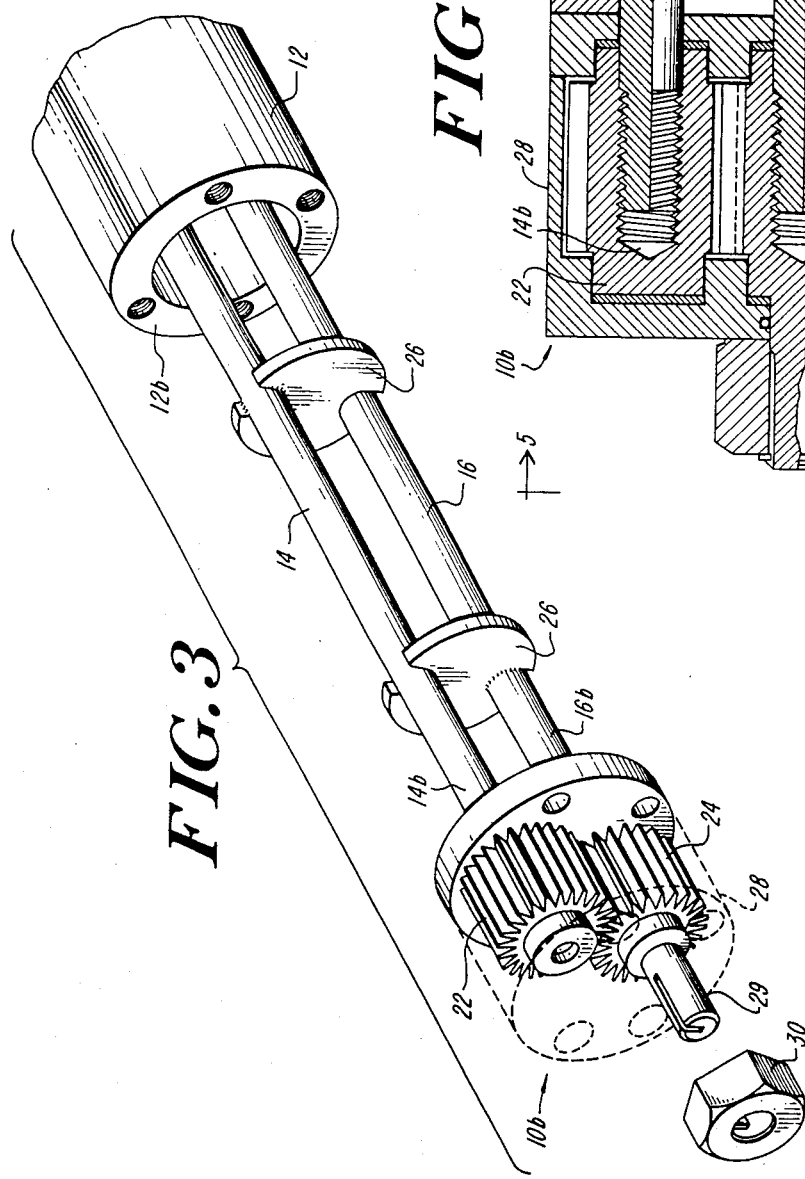

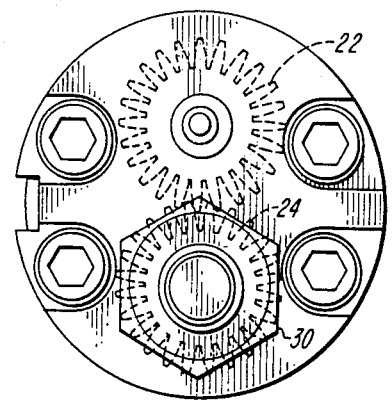
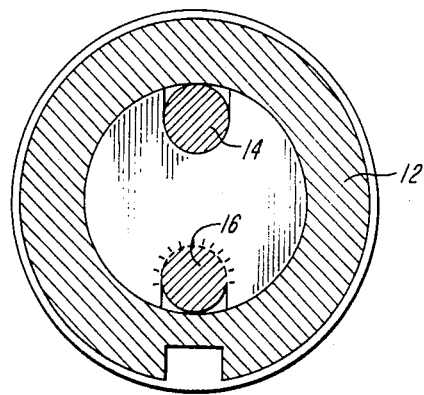
*FIG. 5*   *FIG. 6*
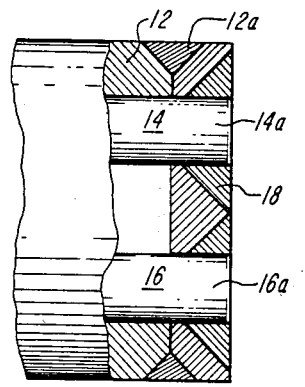
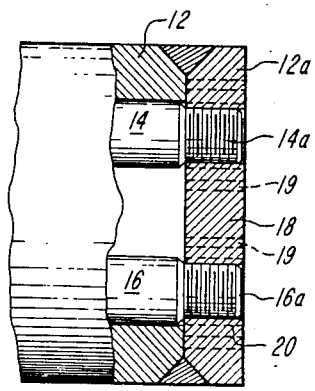
*FIG. 7A*   *FIG. 7B*
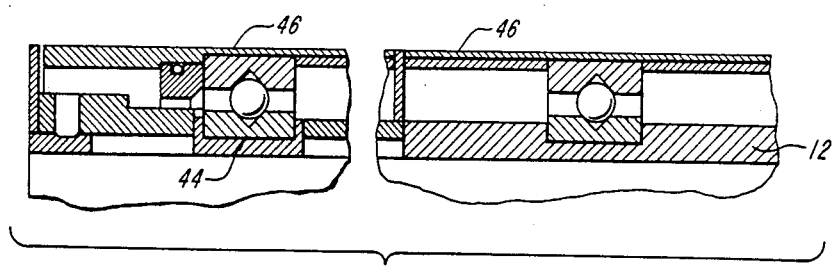
*FIG. 9*

ADJUSTABLE CURVATURE ROLL

CROSS-REFERENCE TO RELATED APPLICATIONS

This application is a continuation of application Ser. No. 822,490 filed Jan. 21, 1986, now abandoned.

BACKGROUND OF THE INVENTION

The present invention relates to curved rolls or bars useful in the control of flexible sheet or web materials, and more particularly to curved rolls or bars, the radius of curvature of which is adjustable. The present invention also relates to straight rolls or bars which may be adjustably curved in opposite directions in a single plane.

Longitudinally curved rolls or bars of a type whose degree of curvature is adjustable have found wide use for the lateral spreading and expansion of sheet materials such as cloth, paper, foil, plastic film, webs of tire cord and the like, both to control the width of the material and to remove wrinkles. Such rolls or bars are also used for correcting bow distortions of the weft threads of woven goods or the courses of knit goods. Although in many applications curved rolls or bars having a fixed degree of curvature or bow are satisfactory, it is often necessary or desirable to provide means for changing the curvature of the roll or bar in order to obtain better control of the processing under varying conditions.

In known rolls, it has proven to be advantageous to incorporate a tension and a compression member within a centrally positioned axle of the roll. In U.S. Pat. No. 3,838,480 a solid axle is split, and a threaded screw-like adjusting means applies tension to one split portion of the axle and compression to another portion of the axle which lies on the opposite side of a neutral bending axis of the axle. The equally applied tension and compression causes a change in the curvature of the axle. Rolls having one piece, split axles have a number of shortcomings. First, the bending force is not evenly distributed across the axle. Also, if either the tension or compression members break, the entire axle must be rebuilt, and the cost of the construction is high.

In other known adjustable deflection rolls, such as the roll of U.S. Pat. No. 3,500,524, a compression member and a tension member are snugly fit within a hollow, circular, straight cylindrical axle. The two members extend lengthwise within the axle, and they meet on a neutral axis of transverse bending of the axle. The two members are longitudinally slidable relative to one another and to the axle. When the curvature of the roll is adjusted, the member being compressed lies on the convex side and the member which is in tension lies toward the concave side. To adjust the tension and compression members, two adjusting screws for each member — one located at each end of a member — are rotated by an amount appropriate to provide the necessary compression and tension. This roll, however, is not a bowed roll. Rather it is a straight roll which deflects, and in operation the roll will attempt to return to a straight position. Such rolls, also only adjust in one direction, and they cannot reverse the direction.

Adjustable deflection rolls of the type described in U.S. Pat. No. 3,500,524 also have a number of shortcomings. First of all, screws must be adjusted on both ends of the roll, and therefore, clearance must be left on both sides of the rolls. Such a need for clearance prevents the rolls from being used in certain tight environments, and in fact, most web processing machines have only a single "tending" side from which adjustments are made. Secondly, the increased length imposes difficulties and limitations where such rolls are required to be mounted between the frames of an existing machine. Thirdly, the two screws must be rotated by an equally opposite amount, and the accuracy of such adjustment will never be perfect. Finally, the roll can only be adjusted in one direction from a straight or curved condition, this limits maximum adjustment to only 50% of what could be achieved with the same elements with adjusting force reversal.

It is therefore a principal object of the present invention to provide an adjustable-curvature roll or bar utilizing separate tension and compression members inserted in a hollow, cylindrical axle, the curvature of which can be accurately and reliably adjusted in both directions from the neutral position.

It is a further object of the present invention to provide an adjustable-curvature roll having separate tension and compression members, both of which are actuated by the turning of a single adjusting means located on one end of the roll.

SUMMARY OF THE INVENTION

The adjustable-curvature roll of the present invention includes a hollow, cylindrical axle in which a tension and a compression rod are inserted. Each of these rods is securely fastened to an endplate at one end of the axle, and the opposite end of each rod is threaded within one of two oppositely rotating intermeshed gears. An adjusting nut or other similar adjusting device is connected to one of the meshed gears and the turning of the adjusting device in one direction causes an increase in the compression applied to one of the rods while at the same time exerting an increased tension on the other rod which is connected to the oppositely rotating gear. This combination of a change in tension and compression causes the curvature of the roll to change. An indicator attached to the adjusting device provides a reading of the amount of curvature change achieved by the rotational adjustment. The axle is surrounded by a rotatable outer surface which rotates, through the aid of ball bearings, around the axle. The purpose of the axle is to provide a control of the contour of the rotatable outer surface of the roll. The term "roll" is intended to describe the assembly of the "axle" and the "rotatable outer surface". In some embodiments, the "rotatable outer surface" may be a series of rigid cylindrical spools or cylinders. In other embodiments, the "rotatable outer surface" is a rubber sleeve.

These and other features and objects of the present invention will be more fully understood from the following detailed description which should be read in light of the accompanying drawings in which corresponding reference numerals refer to corresponding parts throughout the several views.

BRIEF DESCRIPTION OF THE DRAWINGS

FIG. 1 is a simplified plan view of the adjustable-curvature roll of the present invention;

FIG. 2 is a view, partly in perspective, partly in section, of a portion of the adjustable-curvature roll shown in FIG. 1;

FIG. 3 is an exploded perspective view of a portion of the axle of the adjustable-curvature roll shown in FIG. 1;

FIG. 4 is a sectional view of one end of the curved roll shown in FIG. 1;

FIG. 5 is a view taken along lines 5—5 of FIG. 4;

FIG. 6 is a view taken along lines 6—6 of FIG. 4;

FIG. 7a is a sectional view of one end of the axle of the adjustable-curvature roll of FIG. 1;

FIG. 7b is a sectional view of an alternate embodiment of one end of the axle of the adjustable-curvature roll of FIG. 1;

FIG. 9 is a sectional view of an alternate embodiment of the roll shown in FIG. 2;

DETAILED DESCRIPTION OF THE PREFERRED EMBODIMENTS

Figure 8:
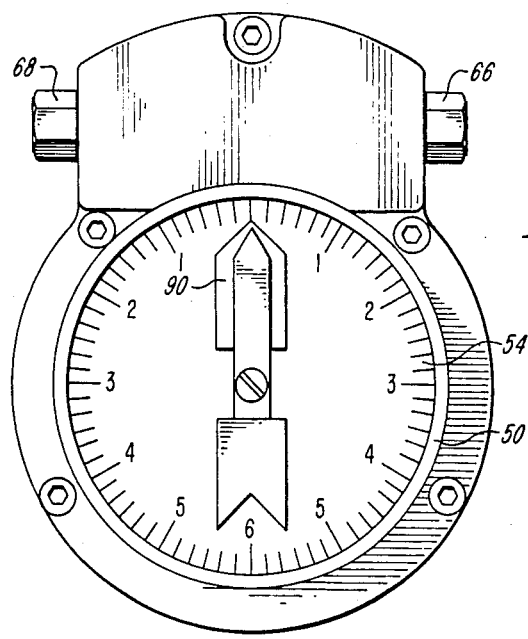
FIG. 8 is a plan view of the indicator which may be connected to an adjustable curvature roll of the type shown in FIG. 3.

As shown in FIGS. 1–3, the improved roll 10 of the present invention includes a longitudinally-curved hollow axle 12 in which two rods 14, 16 are mounted. The axle 12, while in use, has an arcuate configuration, and may be covered with a rotating rubber sleeve 40 as described below. As constructed, the axle 12 may be either curved or straight.

As shown in FIGS. 7a and 7b, each of rods 14, 16 are secured to one end 12a of the axle 12. In the embodiment of FIG. 7a, each end 14a, 16a of rods 14, 16, respectively, are welded to an end plate 18 of the axle 12. In the alternate preferred embodiment shown in FIG. 7b, threaded bushings 19 mounted inside the end plate 18 receive the rods 14, 16 through threads 20. This alternate embodiment allows the rods 14, 16 to be unscrewed thereby avoiding the necessity of cutting open the roll to gain access to the rods.

As shown in FIGS. 3 and 4, the opposite ends 14b, 16b of rods 14, 16, respectively, are threaded into two oppositely rotating, mating, spur gears 22, 24. The rods themselves do not rotate and the spur gears 22, 24 have internal threads which accept the external threads on ends 14b, 16b of rods 14, 16. The threading of the rods 14, 16 into the gears 22, 24 allows the engaging of the rods in a manner sufficient to produce the necessary counteracting forces of tension and compression. The two rods 14, 16 are separated from each other along their lengths by appropriately positioned spacers 26 which reduce the unsupported span of the rods 14, 16 to a safe limit which will not allow buckling of the rods when curvature of the roll is increased or decreased. The spacers 26 are preferably welded to said rods so that every other spacer is welded to rod 14 and the spacers not welded to rod 14 are welded to rod 16.

As shown in FIGS. 2–4, the roll 10 has an elongated neck which houses the gears 22, 24. An adjusting hexagon 30 is attached on the exterior of housing 28 to a splined extension shaft 29 of gear 24. The turning of hexagon 30 allows the application of torque to gear 24, and as gear 24 rotates in one direction, gear 22 will rotate in the opposite direction. As stated above, the rods do not rotate, and therefore, the rotating of gear 24 in one direction causes the pushing of rod 16 relative to end 12a of the axle 12. At the same time, rod 14 is pulled relative to end 12a of the axle 12. When a rod is pulled it is put under tension, and when a rod is pushed it is compressed. When the actuating hexagon 30 is rotated in the opposite direction, the pushing of rod 16 and the pulling of rod 14 is reduced or even reversed.

The terms "pushing and pulling" are not necessarily used in their ordinary sense here. When the roll is in use, one rod is under compression and the other rod is under tension. The pulling of a rod under tension increases the tension and the pulling of a rod under compression reduces the compression rather than actually pulling the rod. Likewise, the pushing of a rod under compression increases the compression and the pushing of a rod under tension reduces the tension rather than actually pushing the rod.

The pushing or pulling of rods 14, 16 results in an adjustment of the curvature of the axle 12 in the following way. As rod 16 is pushed and put under an increased compression it causes the portion of the roll axle in which it lies to undergo tensile strain while the opposite portion of the roll axle is caused to undergo compressive strain by the pulling, and subsequent resulting increased tension, of rod 14. Opposite rotation of hexagon 30 will reduce both the compression in rod 16 and the tension in rod 14 resulting in an opposite reaction in the axle.

This adjustment of the bow of the roll is technically accomplished by producing equal and opposite force couples at each end 12a, 12b of the axle 12. The couples are actually produced at the ends of the axle 12, but they are projected along the length from both ends of the axle as equal couples. When the couples are applied to the axle they will produce a change in the radius of curvature of the axle, and the change in the radius of curvature will be uniform over the entire length of the axle 12. The present invention provides advantages over prior art rolls insofar as in known variable curvature rolls there is a variation in the radius of curvature closer to the end of the axle where the bowing mechanism is present. Furthermore, the variable curvature roll of the present invention has an axle with the same load carrying capacity and the same stiffness in all planes. In known variable curvature rolls, there is a high stiffness in the plane perpendicular to the plane in which the bow is present but in the plane of the bow, the stiffness is approximately one-quarter of the maximum stiffness. As a result, in certain applications, one must be very concerned about changing the application of the load from the sheet. If it is in the plane of the roll curvature, the curvature of the axle will change appreciably when a load is applied.

The axle 12 is covered by a rotatable outer surface which may comprise a series of shells 46 as shown in FIG. 9 or a rubber sleeve 40 as mentioned above and shown in FIG. 2 mounted on shells 46. It is this outer surface which contacts the material to be straightened, unwrinkled, etc. Across the surface of the axle 12 are placed a number of rolling bearing elements 44. Cylindrical shells 46 are placed over the bearings and support the interior surface of the sleeve. In this fashion, the sleeve and/or cylindrical shells rotate around the axle without the axle actually rotating.

The adjustment control mechanism of the present invention is particularly useful insofar as the entire mechanism for bowing the axle is self-contained within the axle. No external bars or tie rods or stiff frame members with cantilever arrangements are required.

Figure 10:
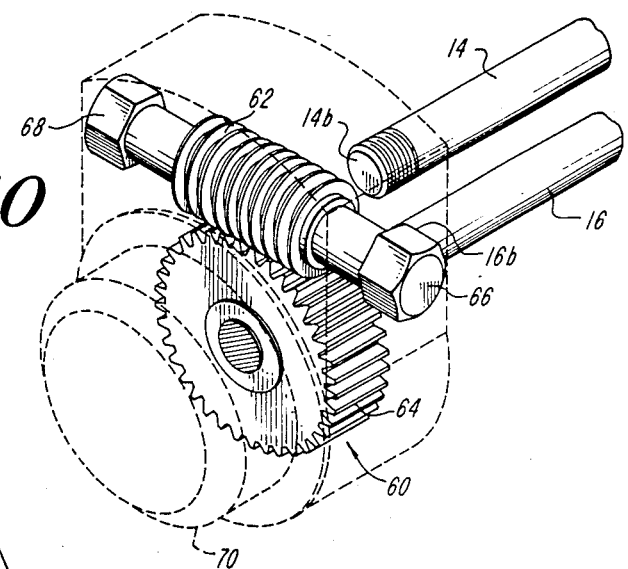
FIG. 10 is a perspective view of an adjusting mechanism of an alternate embodiment of the roll of the present invention.

Referring to FIG. 10, an alternate embodiment of the adjusting mechanism of the present invention utilizes a worm gear drive 60 including a worm 62 and a wheel 64. The splined shaft 29 of gear 24 (not shown in FIG. 10) is connected through the center of wheel 64 so as to rotate with the wheel. In this embodiment, as in the embodiment of FIG. 3, the rotating of the shaft 29 causes rotation of gear 24 (not shown in FIG. 10) which in turn causes an opposite rotation of gear 22 (not shown in FIG. 10). The counteracting forces of tension and compression are also produced in the same fashion as described above with reference to the embodiment of FIG. 3. The worm gear may be adjusted from either side by turning either hexagon 66 or hexagon 68. This side adjustment mechanism allows the roll of the present invention to be utilized in tight fitting locations where an end adjustment is not possible.

A further feature of the present invention is the dial indicator 50 which is shown in FIG. 8. The indicator 50 includes a rotating dial 54 driven by a gear attached to gear 24, and a fixed pointer 90. The indicator 50 is read from the end on which the indicator is mounted. The indicator 50 basically indicates the amount of rotation of the gear 24 so that when different materials are interchanged on the machine utilizing the roll, a proper setting can be set up immediately for a previously run material for which a proper setting has already been established. In use, the movement of dial 54 corresponds to the amount of turn made for setting the roll curvature to treat a specific web material, and once a proper setting is arrived at, the dial reading is recorded and saved for a later time, at which time the hexagons 66 and 68 are rotated to achieve the same amount of roll curvature.

A futher modification of indicator 50 allows viewing from the side, as shown in FIG. 10, item 70.

Figure 11:
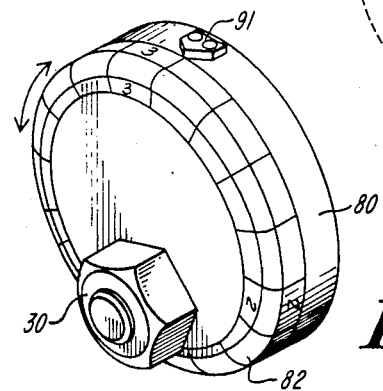
FIG. 11 is a perspective view of an alternate embodiment of the indicator shown in FIG. 8.

Referring to FIG. 11, an alternate embodiment of the indicator is provided which may be viewed from either the side or the end of the roll. A rotating dial 82 is connected to the end 10b of the roll so as to rotate by an amount equal to the amount of turn applied to an adjusting mechanism such as hexagon 30. Indicator lines are placed on both the front and the side of a face plate 82 which is positioned over the end 10b of the roll 10. A fixed pointer 91 is attched to circular member 80. As with the embodiment described above, once a proper setting is achieved, the dial reading may be recorded for future use.

While the foregoing invention has been described with reference to its preferred embodiments, it should not be limited to such embodiments since various alterations and modifications will occur to those skilled in the art. For example, the hexagon 30 can be replaced by other conventional means for rotating a gear. Also, any other means for mounting a sleeve for rotation around a stationary axle may be employed, and adjusting rod cross sections may be of any shape. All such variations and modifications are intended to fall within the scope of the appended claims.

What I claim is:

1. A stationary axle for an adjustable curvature roll comprising:
    a longitudinally elongated, hollow, cylindrical body;
    two longitudinally extending rods inserted within said hollow, cylindrical body, a first end of both of said rods being secured to an end plate at a first end of said body;
    means attached to a second end of each rod and cooperating together to simultaneously apply a tensile axial force to either one of said two rods and a compressive axial force to the other rod; and
    means connected to said force applying means for effecting simultaneous application of the axial forces to said rods.

2. A roll comprising the the axle of claim 1, and:
    an outer sleeve having an inner circumference greater than the outer circumference of said body, said sleeve being formed of an elastomeric material; and
    means for rotatably mounting said outer sleeve around said body, said outer sleeve rotating while said body remains stationary to form a roll.

3. The roll of claim 2 wherein said mounting means comprises:
    a plurality of rolling element bearings with rolling elements and an associated two-piece race for each of said rolling elements, one piece of said two-piece race being attached to said hollow, cylindrical body, and the other piece of said two-piece race being attached to the interior surface of said outer sleeve.

4. The roll of claim 2 wherein said sleeve comprises a substantially continuous tubular wall extending over substantially the full length of said body.

5. The axle of claim 1 wherein spacer means are interspersed between said two rods at at least two spaced locations along the lengths of said rods.

6. The axle of claim 5 wherein every other of said spacer means are welded to one rod with the intervening spacer means being welded to the other rod.

7. The axle of claim 1 wherein said longitudinally elongated, hollow cylindrical body is curved.

8. A roll comprising the axle of claim 1 and further comprising:
    an outer rotatable sleeve including a series of adjacent cylindrical shells;
    means for rotatably mounting said cylindrical shells around said body, said shells rotating while said body remains stationary.

9. The roll of claim 8 wherein said mounting means comprises:
    a plurality of rolling element bearings with rolling elements and an associated two-piece race for each of said rolling elements, one piece of said two-piece race being attached to said hollow, cylindrical body, and the other piece of said two-piece race being attached to the interior surface of an associated outer shell.

10. A stationary axle for an adjustable curvature roll comprising:
    a hollow, cylindrical body;
    two longitudinally extending rods inserted within said hollow, cylindrical body, a first end of both of said rods being secured to an end plate at a first end of said body;
    means attached to a second end of each rod to apply a tensile axial force to one rod and a compressive axial force to the other rod;
    said force applying means comprising two intermeshed, oppositely rotating gears, a gear being connected to a second end of a respective one of said rods, said second ends of said rods being opposite said first ends of said rods, each of said gears including means to alter the relative axial position between each gear and its connected rod without rotating said rod so as to modify the force exerted on said rods; and
    means for rotating said gears.

11. The axle of claim 10 wherein said altering means comprises threads on the exterior surfaces of said rods and corresponding mating threads on the interior surfaces of said gears, and the two gears are axially fixed in said body.

12. The axle of claim 10 wherein said rotating means comprises an adjusting means attached to one of said gears, the actuation of said adjusting means causing opposite rotation of said two rotating gears so as to change the curvature of said body.

13. The axle of claim 12 further comprising indicator means connected to one of said gears for indicating a relative amount of curvature of said body.

14. The axle of claim 10 wherein said two gears are enclosed within a housing positioned at one end of said body.

15. The axle of claim 10 wherein said rotating means comprises a worm gear mechanism including worm and a wheel, said wheel rotating with a shaft connected to one of said gears and said worm being rotated by an external member to control the force exerted on said rods.

16. An adjustable curvature roll comprising:
a longitudinally-elongated hollow, stationary axle;
an outer sleeve having an inner circumference greater than the outer circumference of said axle, said sleeve being formed of an elastomeric material;
means for rotatably mounting said outer sleeve around said axle, said outer sleeve rotating while said axle remains stationary;
a pair of longitudinally extending rods inserted within said hollow, stationary axle, a first end of said rods being rigidly secured at one end of said axle;
two intermeshed, oppositely rotating gears, a gear being connected to a second end of a respective one of said rods, said second ends of said rods being opposite said first ends of said rods, each of said gears including means to alter the axial position between each gear and its connected rod without rotating said rod so as to modify the force exerted on said rods; and
means for rotating said gears.

17. The adjustable curvature roll of claim 16 wherein said mounting means comprises:
a plurality of rolling element bearings with rolling elements and an associated two piece race for each of said rolling elements, one piece of said two piece race being attached to said stationary axle, and the other piece of said two piece race being attached to the interior surface of said outer sleeve.

18. The adjustable curvature roll of claim 16 wherein said altering means comprises threads on the exterior surfaces of said rods and corresponding mating threads on the interior surfaces of said gears.

19. The adjustable-curvature roll of claim 16 wherein spacer means are interspersed between said two rods at at least two spaced locations along the lengths of said rods.

20. The adjustable-curvature roll of claim 19 wherein every other of said spacer means are welded to one rod with the other spacer means being welded to the intervening rod.

21. The adjustable-curvature roll of claim 16 wherein said longitudinally, elongated, hollow stationary axle is curved.

22. The adjustable-curvature roll of claim 16 wherein said sleeve comprises a substantially continuous tubular wall extending over substantially the full length of said axle.

23. The adjustable-curvature roll of claim 16 wherein said rotating means comprises an adjusting means attached to one of said gears, the actuation of said adjusting means causing opposite rotation of said two rotation gears so as to change the curvature of said roll.

24. The adjustable-curvature roll of claim 23 further comprising indicator means connected to one of said gears for indicating a relative amount of curvature of said roll.

25. The adjustable-curvature roll of claim 16 wherein said two gears are enclosed within a housing positioned at one end of said axle.

* * * * *